(12) United States Patent
Zhao

(10) Patent No.: US 6,271,929 B1
(45) Date of Patent: Aug. 7, 2001

(54) METHOD AND APPARATUS FOR ROTATING AN INPUT COLOR IMAGE BY NINETY DEGREES

(75) Inventor: Jun Zhao, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/062,011

(22) Filed: Apr. 17, 1998

(51) Int. Cl.[7] .............................. B41B 15/00; H04N 1/21; H04N 1/00; G06K 9/32
(52) U.S. Cl. .................. 358/1.18; 358/1.17; 358/1.16; 358/296; 358/438; 358/448; 382/296; 382/297
(58) Field of Search .................................... 358/296, 438, 358/448, 1.18, 1.17, 1.16; 382/297, 296; 345/126

(56) References Cited

U.S. PATENT DOCUMENTS

| | | | |
|---|---|---|---|
| 4,797,852 | 1/1989 | Nanda | 364/900 |
| 4,806,920 | 2/1989 | Sawada | 340/727 |
| 4,829,452 | 5/1989 | Kang et al. | 364/518 |
| 4,916,746 | 4/1990 | Yeschick | 382/46 |
| 4,929,085 | 5/1990 | Kajihara | 364/518 |
| 5,081,700 | 1/1992 | Crozier | 395/150 |
| 5,124,692 | 6/1992 | Sasson | 340/727 |
| 5,263,135 | 11/1993 | Dei | 395/163 |
| 5,598,181 | * 1/1997 | Kermisch | 345/126 |

OTHER PUBLICATIONS

"Adobe Photoshop 4.0 User Guide for Macintosh and Windows", Adobe Systems Inc. 1996, Table of Contents and pp. 185–189.

"HALO Imaging Library Programming Guide", Media Cybernetics 1995, Table of Contents and pp. 2–115 through 2–117.

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

A method for rotating an image using a volatile memory and temporary files includes inputting an image, dividing the input image into portions, loading a divided portion of the input image into the volatile memory, and rotating the loaded divided portion of the input image. The divided portion of the input image is output into a corresponding temporary file, and the loading, rotating and outputting steps performed on the divided portions of the input image are repeated until all divided portions of the input image have been processed. The temporary files are then divided into portions, and one divided portion from each temporary file is loaded into the volatile memory. Finally, the loaded divided portions of the temporary files are assembled, the assembled divided portions of the temporary files are output to a destination image, and the loading, assembling and outputting steps performed on the divided portions of the temporary files are repeated until all divided portions of the temporary files have been processed.

30 Claims, 7 Drawing Sheets

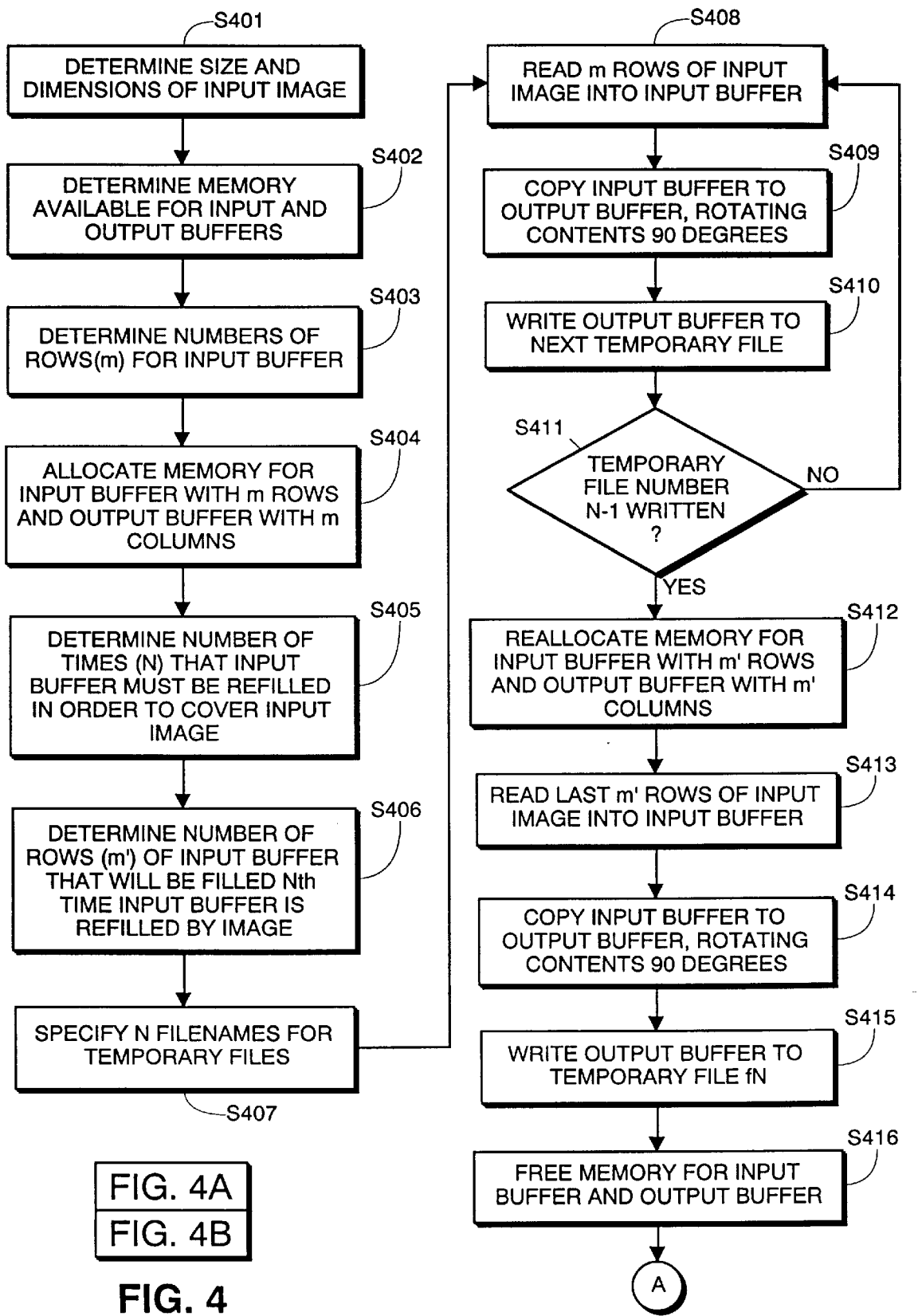

METHOD AND APPARATUS FOR ROTATING AN INPUT COLOR IMAGE BY NINETY DEGREES

BACKGROUND OF THE INVENTION

1. Field of the Invention

The present invention relates to a method and apparatus for rotating a color image by 90° and, in particular, an efficient method for rotating a color image by 90° using temporary files.

2. Description of the Related Art

Color image editing systems typically include a scanner and a computer system which is equipped with document viewing and editing applications for storing and editing inputted document images. Typically, once an image is scanned in, the operator views the image on the display of the computer system and, if necessary, can edit the image by adjusting color, tone, size, image attributes, rotation, etc. Paint Shop® and Microsoft Paint® are examples of these document image editing applications. Once the image has been edited by the operator, a final version of the image can be output using a printer or the like.

Due to the advances in computer technology and printing technology, color image editing systems are being used more and more on desktop computers. However, because desktop computers tend to have limited memory space, image editing and, in particular, color image editing, which uses a large amount of memory space, increases system processing time due to the amount of file-swapping and memory required. This is particularly troublesome when attempting to rotate a color image by 90°. In this regard, to rotate an image by 90°, a color image is conventionally randomly accessed by loading an entire image into a memory such that random access of each pixel can be possible. However, as the image size becomes larger and/or resolution becomes higher, this conventional method does not work efficiently or work at all with limited memory resources.

Attempts have been made to resolve the foregoing problem by using file-swapping methods. However, these methods are disadvantageous in the case when the memory size required to load an entire image into memory is bigger than half the size of the available memory due to an extremely large number of file-swappings which must occur. As a result, the processing time grows exponentially as the image size increases.

SUMMARY OF THE INVENTION

According to the present invention there is provided a method for rotating a color image by defining temporary files for intermediate storage of rotated and non-rotated portions of a color image. Because the color image is divided into portions, it is possible to temporarily store both rotated and non-rotated portions of the color image in an image memory buffer which is smaller than the entire color image. As a result, there is no need to use random access of the input color image, thereby increasing performance and decreasing memory size and costs.

Thus, in one aspect of the present invention, the invention is a method for rotating a color image by using a volatile memory. The method includes the steps of inputting an image, dividing the input image into portions, loading a divided portion of the input image into a volatile memory, and rotating the loaded divided portion of the input image. The rotated divided portion of the input image is output into a corresponding temporary file, and the loading, rotating and outputting steps performed on the divided portions of the input image are repeated until all divided portions of the input image have been processed. The temporary files are divided into portions, and one divided portion from each temporary file is loaded into the volatile memory. The loaded divided portions of the temporary files are then assembled, and the assembled divided portions of the temporary files are output to a destination image. Finally, the loading, assembling and outputting steps performed on the divided portions of the temporary memory files are repeated until all divided portions of the temporary files have been processed.

In the preferred embodiment, the steps of dividing the input image into portions and repeatedly loading a divided portion of the input image into a volatile memory occur coextensively. In other words, the input image is loaded in portions, thereby automatically dividing the input image. Furthermore, in the preferred embodiment, the steps of dividing the temporary files into portions and repeatedly loading one divided portion from each temporary file into the volatile memory occur coextensively. In other words, the temporary files are loaded in portions, thereby automatically dividing the temporary files.

The input image is preferably a color image. The destination image can be output to a file, a printer, a network, or any other desired destination.

In another aspect, the invention is a method for rotating an image. The method includes the steps of inputting an image, allocating an image input buffer, determining a number of times that the image input buffer needs to be refilled in order to load the entire input image, and dividing the input image into portions based on the determination made in the determining step. A number of temporary files to be used for storing the divided portions of the input image is specified, and a divided portion of the input image is read into the image input buffer. The read divided portion of the input image is then rotated, and the rotated divided portion of the input image is written to a corresponding temporary file. The reading, rotating and writing steps performed on the input image are repeated until all portions of the input image have been written into the temporary files. A number of temporary file input buffers is allocated, each temporary file input buffer corresponding to one of the temporary files. An output buffer whose size is the sum of sizes of all temporary file input buffers is allocated, and a portion of each temporary file is read into the corresponding temporary file input buffer. Each temporary file input buffer is copied to a corresponding place in the output buffer, and the output buffer is output to a destination image file. Finally, the reading, copying and outputting steps are repeated until the destination image has been formed.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIGS. 4A and 4B comprise a flowchart for explaining rotation of an input image by 90° according to the invention.

DETAILED DESCRIPTION OF THE PREFERRED EMBODIMENT

Figure 1:
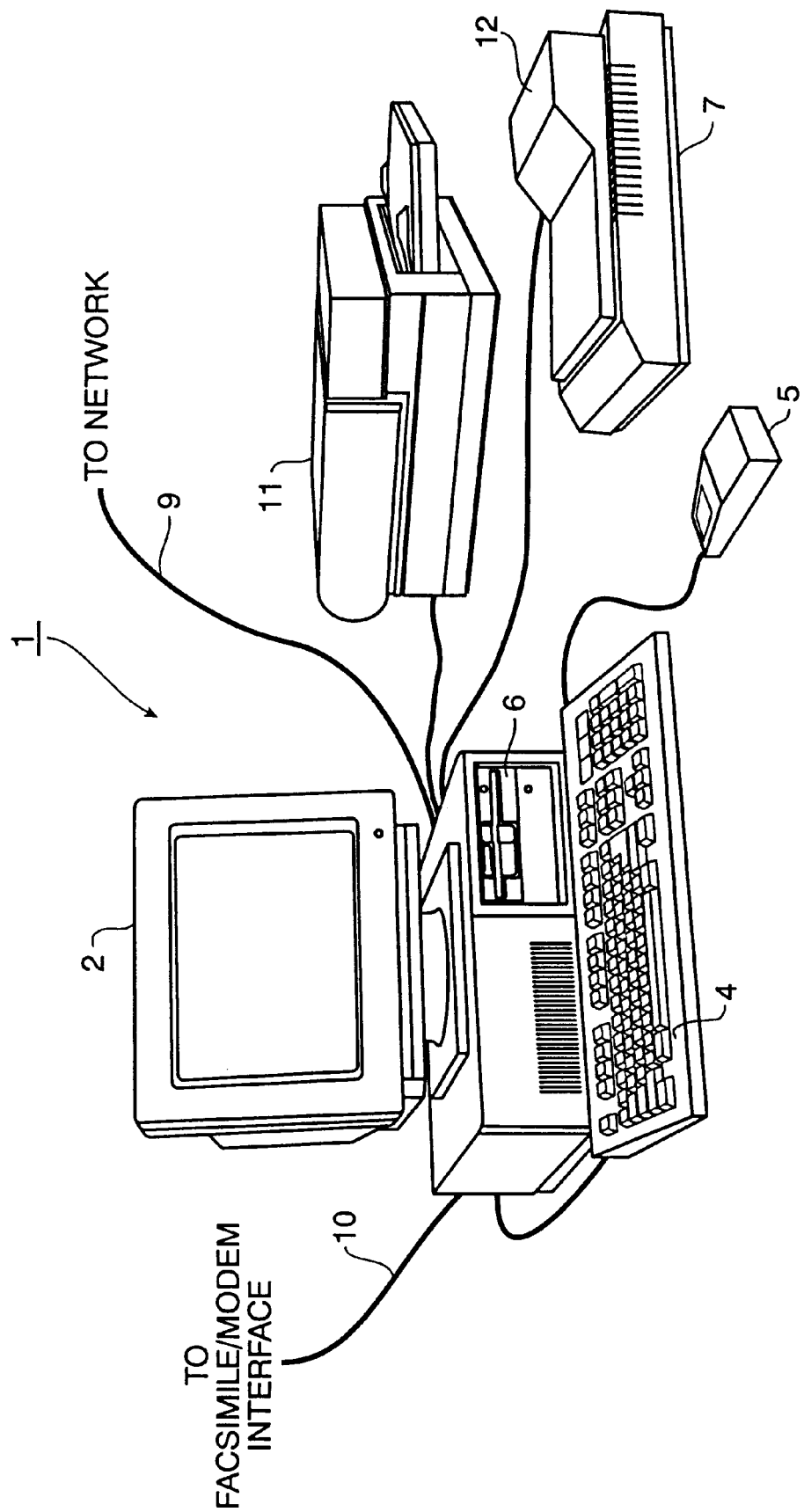
FIG. 1 is a representational view of a computer system in which the present invention may be utilized.

FIG. 1 is a representational view of a computer system in which the present invention may be utilized. Computer system 1 may be a Macintosh, PC-compatible, or other type of system having a windowing environment, such as Microsoft® Windows. Provided with computer system 1 are display 2 which may be a color monitor, keyboard 4 for entering user commands and pointing device 5 such as a mouse for pointing to and for manipulating graphical user interfaces and other objects displayed on display 2.

Computer system 1 also includes a mass storage device such as fixed disk 6 for storing computer executable process steps for image processing applications, image rotation code, other applications and the like. Such storage may also be provided by a CD-ROM (not shown).

Scanner 7 and film adapter unit 12 are image acquisition devices that are also included. Scanner 7 may be used to scan documents so as to provide images of those documents to an image processing application executing within computer system 1. Film adapter unit 12 is an adapter that attaches to certain models of scanner 7 so as to allow scanner 7 to perform similar functions with film instead of with documents. Of course, images may be input into computer system 1 using other image acquisition devices, such as a digital camera or the like. Images also may be input into computer system 1 from a variety of other sources, such as from a Local Area Network (LAN) through network interface 9. Printer 11 is provided for outputting processed images.

It should be understood that, although a programmable general purpose computer is shown in FIG. 1, a dedicated computer terminal or other type of data processing equipment can utilize the present invention.

Figure 2:
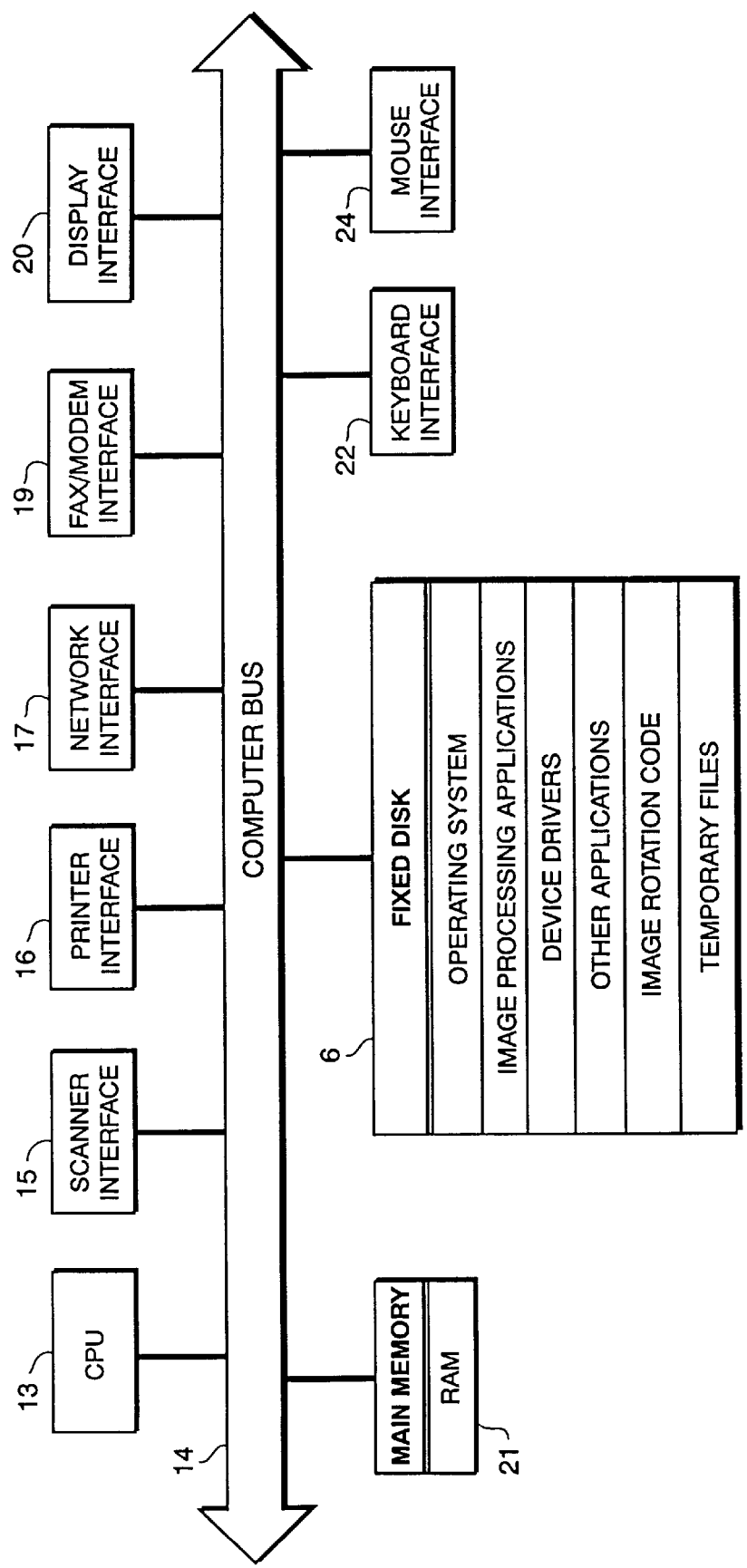
FIG. 2 is a detailed block diagram showing the internal architecture of the computer system shown in FIG. 1.

FIG. 2 is a detailed block diagram showing the internal architecture of computer system 1. As shown in FIG. 2, computer system 1 includes central processing unit (CPU) 13 which interfaces with computer bus 14. Also interfacing with computer bus 14 is scanner interface 15, printer interface 16, network interface 17, facsimile/modem interface 19, display interface 20, main random access memory (RAM) 21, fixed disk 6, keyboard interface 22, and mouse interface 24.

Main memory 21 is a volatile memory that interfaces with computer bus 14 so as to provide RAM storage to CPU 13 during execution of software applications. More specifically, CPU 13 loads process steps from fixed disk 6 into main memory 21 and executes the stored process steps from main memory 21 in order to execute applications. Data such as source and destination images, file buffers, input buffers and output buffers can be stored in main memory 21, where the data can be accessed by CPU 13 during execution of the process steps.

As also shown in FIG. 2, fixed disk 6 typically can contain an operating system, device drivers, image processing applications such as Adobe Photoshop or Corel Draw, image rotation code, other applications, temporary files and the like.

Figure 3:
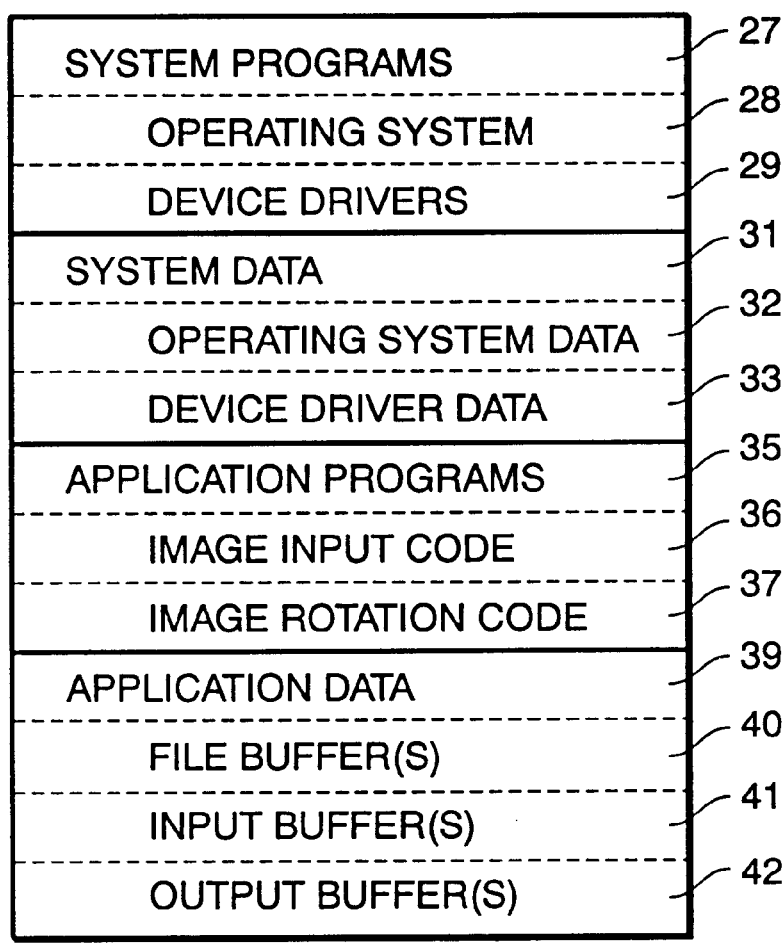
FIG. 3 is a representational view of a memory map of a main memory configured according to the invention.

FIG. 3 is a representational view of a memory map of main memory 21 configured according to the invention. In the preferred embodiment, main memory 21 is configured to store system programs 27, including operating system 28 and device drivers 29, and system data 31, including operating system data 32 and device driver data 33. In addition, main memory 21 stores application programs 35, including image input code 36 and image rotation code 37, and application data 39. The application data includes file buffers 40, input buffers 41 and output buffers 42. It should be noted that main memory 21 can also include a great variety of other programs, data, and the like.

If main memory 21 is of insufficient size to store all of the programs and data, file-swapping techniques can be used to store portions of those programs and data. In particular, the least used portions of the programs and data are typically stored on fixed disk 6 in temporary files. Thus, by virtue of this construction, computer system 1 can utilize programs and data that exceed the size of main memory 21. However, such file-swapping techniques slow down the operation of computer system 1. Accordingly, it is desired to keep file-swapping to a minimum.

For example, when application programs 35 include image rotation code 37 for rotating a large image stored at least partly in application data 39, file-swapping may be inevitable when performing the image rotation. In particular, if the size of the image exceeds one-half of the free space in main memory 21, then file-swapping will be required for performing the image rotation. This file-swapping typically will slow down computer system 1.

In order to minimize the impact of file-swapping on the operating speed of computer system 1, it is preferable to keep to a minimum the number of times that data is swapped to and from fixed disk 6. In addition, it is preferable that all file access operations occur sequentially through a given file. Such sequential file access operations are significantly faster than random file access operations. The image rotation method according to the invention advantageously utilizes less file-swapping than conventional methods, and can utilize sequential file access operations for all file operations, thereby increasing the efficiency of computer system 1 when performing image rotation.

Briefly, the image rotation method includes the steps of inputting an image, dividing the input image into portions, loading a divided portion of the input image into a volatile memory, and rotating the loaded divided portion of the input image. The rotated divided portion of the input image is output into a corresponding temporary file, and the loading, rotating and outputting steps performed on the divided portions of the input image are repeated until all divided portions of the input image have been processed. The temporary files are divided into portions, and one divided portion from each temporary file is loaded into the volatile memory. The loaded divided portions of the temporary files are then assembled, and the assembled divided portions of the temporary files are output to a destination image. Finally, the loading, assembling and outputting steps performed on the divided portions of the temporary files are repeated until all divided portions of the temporary files have been processed.

Figure 4B:
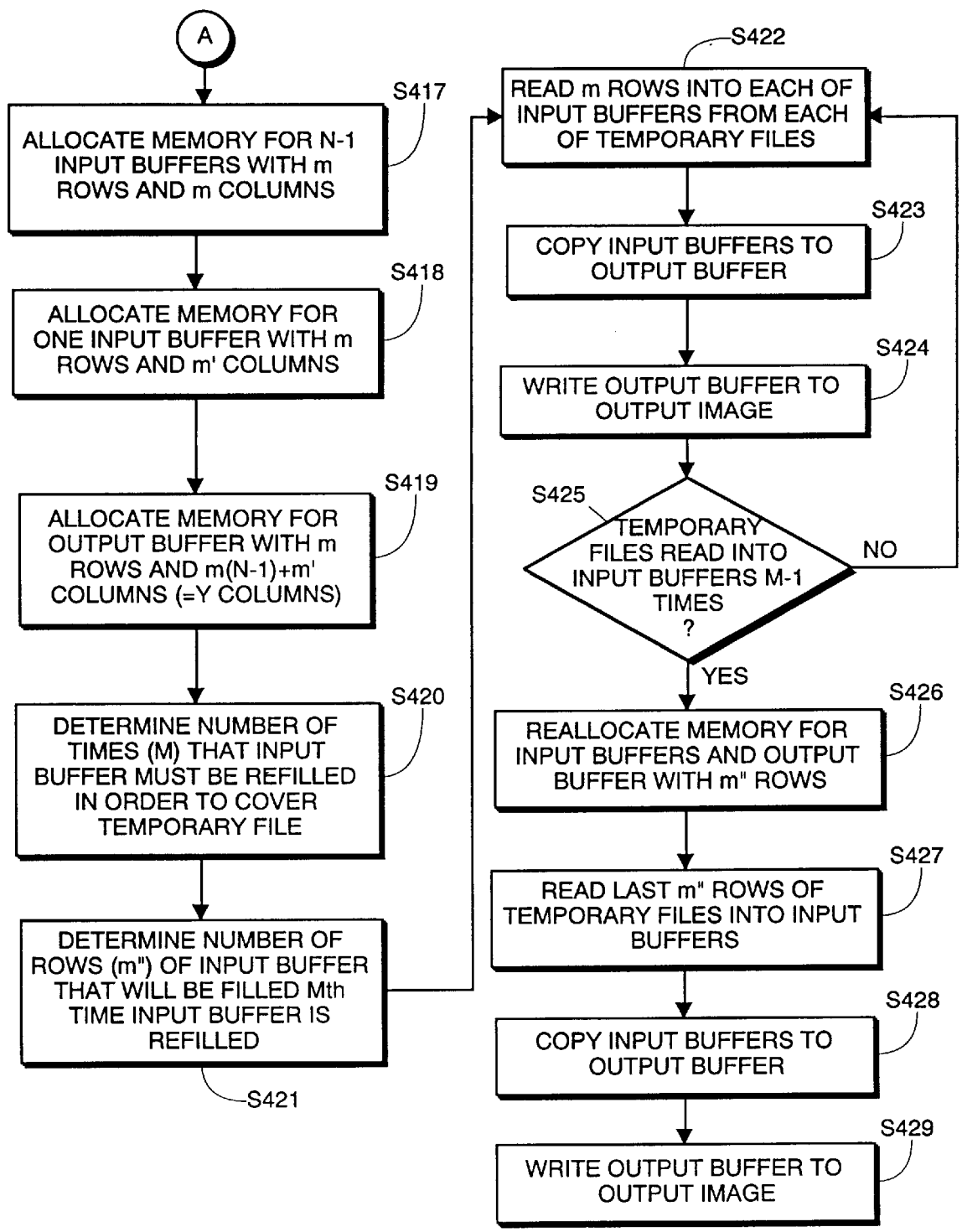

FIGS. 4A and 4B comprise a flowchart for explaining rotation of an input image by 90° according to the invention. It should be noted that in the preferred embodiment, the input image is a color image, which requires far more memory than a gray-scale or binary image. However, the image rotation method according to the invention works equally well with color, gray-scale and binary images.

In more detail, in step S401, size and dimensions (e.g., X pixels wide by Y pixels high) of the input image are determined. In step S402, the amount of main memory 21 available for input buffers and output buffers is determined. The available memory is that memory not otherwise being used by system programs, system data, application programs, other application data, and the like. Typically, a function call exists in operating system 28 for determining the amount of available memory.

In step S403, the number of rows m for an input buffer is determined from the results of steps S401 and S402. In the preferred embodiment, m is selected such that neither m number of rows of the input image nor m number of columns of the input image occupy more than one-half of the available amount of main memory 21. By virtue of this selection of a value for m, data can be loaded into input buffer(s) and copied from input buffer(s) to output buffer(s) throughout the operation of the rotation method according to the invention without swapping the data out to hard disk 6. Thus, this selection of a value for m minimizes the amount of file-swapping necessary for performing the image rotation, thereby increasing the efficiency of the image rotation process.

In step S404, memory is allocated for an input buffer with the same number of columns as the input image and m rows. In this step, memory is also allocated for an output buffer with the opposite dimensions. In other words, the output buffer has the same number of rows as the input buffer has columns, and the output buffer has the same number of columns as the input buffer has rows.

The number of times N that the input buffer must be refilled in order to cover the entire input image is determined in step S405. The input image may not have sufficient data to completely fill all m rows of the input buffer the Nth time that the input buffer is filled. Accordingly, in step S406, the number of rows m' of the input buffer that will be filled the Nth time that the input buffer is refilled by the input image is determined.

In step S407, N file names for temporary files are specified. In the preferred embodiment, these file names are specified with a technique that avoids conflict with existing file names on computer system 1. These temporary files are denoted as $f_1, f_2, \ldots f_N$ below.

In the following steps, the input image is divided into portions, the portions are rotated, and the rotated portions are each written to a separate temporary file.

In step S408, m rows of the input image are read into the input buffer. The effect of step S408 is to divide the input image into portions, and then to load the divided portions into the input buffer.

The input buffer is then copied to the output buffer in step S409, with the contents rotated 90°. Then, in step S410, the output buffer is written to one of the temporary files.

In step S411, it is determined if data has been written to the N-1th temporary file. If data has not been written to the N-1th temporary file, then flow returns to step S408, and the next m rows of the input image are read into the input buffer. The input buffer is again copied to the output buffer in step S409, rotating the contents by 90°, and the output buffer is written to the next temporary file in step S410. Thus, steps S408 through S411 are repeated until the N-1th temporary file has been written.

After the N-1th temporary file has been written, flow proceeds to step S412. In step S412, memory is reallocated for an input buffer with m' rows instead of m rows and an output buffer with m' columns instead of m columns. In other words, memory is reallocated for the input buffer and the output buffer so as to accommodate the last m' rows of the input image. Note that in the preferred embodiment, reallocating memory for the input buffer and output buffer inherently includes first freeing the memory allocated for the original-sized input buffer and output buffer.

It should be noted that in an alternative embodiment, it is not necessary to reallocate the input buffer and the output buffer because the original-sized buffers are large enough to accommodate the last m' rows of the input image.

In step S413, the last m' rows of the input image are read into the input buffer. Then, the input buffer is copied to the output buffer in step S414, rotating the contents of the input buffer by 90°. In step S415, the output buffer is written to the Nth and last temporary file.

At this point, entire input image has been divided into portions, and the portions have been individually rotated and written into respective ones of temporary files. Accordingly, it is now necessary to reassemble these rotated portions of the input image into the rotated destination image. This reassembly process requires differently-sized input buffers and a differently-sized output buffer. Accordingly, in step S416, the memory for the foregoing input buffer and output buffer is freed.

Next, part of main memory 21 is allocated for N input buffers and an output buffer. These buffers are for use in reassembling the data in the temporary files into the rotated destination image. In step S417, memory is allocated for N-1 input buffers with m rows and m columns each. In step S418, memory is allocated for one input buffer with m rows and m' columns. In the following discussion, these buffers are denoted as $b_1, b_2, \ldots b_N$. In step S419, memory is allocated for an output buffer with m rows and m(N-1)+m' columns. It should be noted that the value m(N-1)+m' is equal to the number of rows in the input image, and therefore is equal to the number of columns in the rotated destination image.

In the following steps, each input buffer is filled with portions of data from a corresponding one of the temporary files. The input buffers are then copied to the output buffer, which is written to the destination file.

Thus, in step S420, the number of times M that an input buffer must be refilled in order to cover the corresponding temporary file is determined. Then, in step S421, the number of rows m" of the input buffer that will be filled the Mth time (i.e., the last time) an input buffer is refilled with the corresponding temporary file is determined.

In step S422, m rows of data are read into each input buffer from each of the corresponding temporary files. The effect of step S422 is to divided the temporary files into portions, and then to load the divided portions into the input buffers.

It should be noted that when the input image is rotated clockwise, the temporary files are read into the input buffers in reverse order. In other words, temporary file $f_1$ is read into input buffer $b_N$, temporary file $f_2$ is read into input buffer $b_{N-1}$, etc. On the other hand, if the input image is rotated counter-clockwise, then the temporary files are read into the input buffers in forward order. In other words, temporary file $f_1$ is read into buffer $b_N$, temporary file $f_2$ is read into buffer $b_2$, etc.

The input buffers are assembled and copied into the output buffer in step S423. Then, in step S424, the output buffer is written to the output image.

It is then determined if the temporary files have been read into the input buffers M-1 times in step S425. In other words, it is determined if (M-1) times m rows of the temporary files have been processed. If the temporary files have not been read into the input buffers M−1 times, flow returns to step S422 for processing of the next m rows. If the temporary files have been read M−1 times, flow proceeds to step S426. In step S426, memory is reallocated for input buffers and output buffers with m" rows. The column counts of the input buffers and output buffer remain unchanged.

In step S427, the last m" rows of the temporary files are read into the corresponding input buffers. These are the last rows of the temporary files that have not yet been processed. Then, in step S428, the input buffers are assembled into the output buffer, and in step S429, the output buffer is written to the rotated destination image. At this point, the entire input image has been rotated and output to the destination file.

In the above process, sequential reading and writing operations can be used for all temporary file operations. In other words, no random access file operations are required. Thus, in addition to minimizing the number of file operations required to rotate the image, the invention also can utilize the more efficient sequential file operations rather than less efficient random access file operations.

It should be noted that while the invention is described above in terms of generating a rotated destination file, the invention can also be used to create a rotated destination image for use by a printer or for output to, for example, a network interface. In these cases, steps S424 and S429 simply perform the appropriate type of image output operations.

It should also be noted that, in the above description of the preferred embodiment, the same value m is used for the size of the buffers in steps S403 and S404 and for the number of rows for the buffers in steps S417 and S418. However, in an alternative embodiment, a different value for m can be used in these two instances. In other words, the value for m in steps S417 and S418 for the number of rows of the input buffers and the output buffer need not be equal to the value for m in steps S403 and S404. In this alternative embodiment, the number m in steps S403 and S404 is determined strictly with respect to the number of columns X in the input image. In particular, m is chosen so that m times X columns will occupy no more than one-half of the available memory for the input and output buffers. In addition, before step S417, a new value for m is determined strictly with respect to the number of rows Y in the input image. In particular, the new value for m is determined such that m times Y rows of the source image (i.e., m x Y columns of the destination image) will occupy no more than one-half of the available memory for input and output buffers.

Figure 5A:
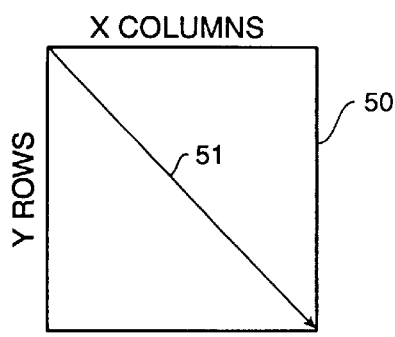
FIGS. 5A through 5L are representational views for explaining rotation of an input image by 90° clockwise according to the invention.

FIGS. 5A through 5L are representational views for illustrating rotation of an input image by 90° clockwise according to the invention. FIG. 5A shows input image 50 with X columns and Y rows. Included in input image 50 is arrow 51, which is used below to help illustrate the operation of the invention.

Figure 5B:
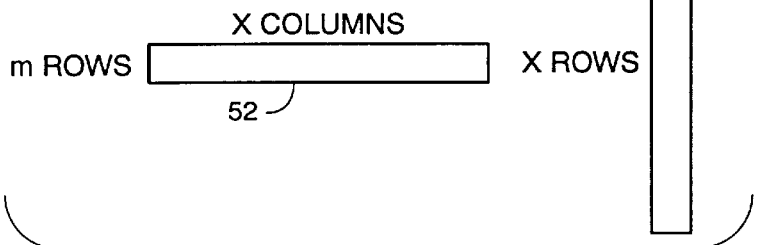

FIG. 5B shows input buffer 52 and output buffer 53. Input buffer 52 has X columns and m rows. Output buffer 53 has m columns and X rows. The value for m is chosen as described above with reference to steps S403 and S404.

Figure 5C:
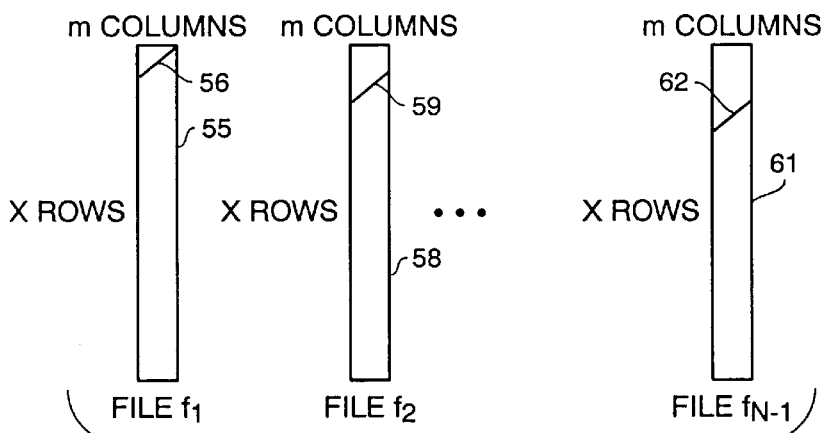

FIG. 5C shows temporary files $f_1$ through $f_{N-1}$. These temporary files are formed by successively copying rotated portions of input image 50 from output buffer 53. As a result, file $f_1$, denoted by reference numeral 55, comprises the first m rows of input image 50 rotated 90° clockwise. Thus, portion 56 of arrow 51 is located at the top of temporary file $f_1$. Likewise, file $f_2$, denoted by reference numeral 58, and file $f_{N-1}$, denoted by reference numeral 61, each have portion 59 and portion 62 of arrow 51, respectively.

Figure 5E:
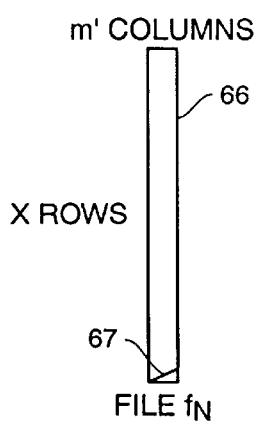
Figure 5D:
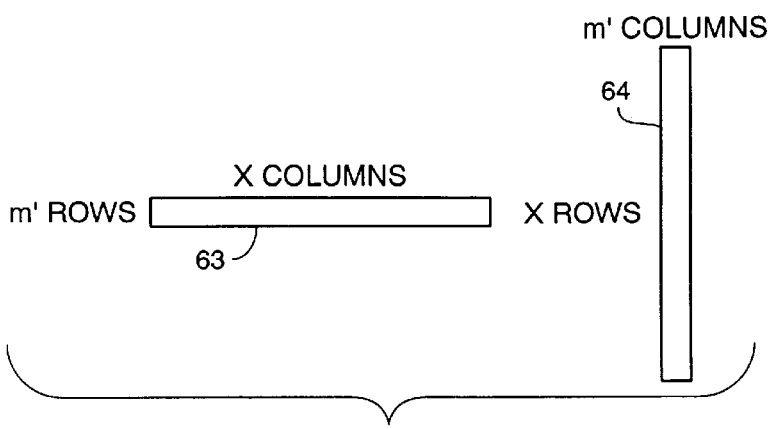

FIG. 5D shows input buffer 63 and output buffer 64, which are the same as input buffer 52 and output buffer 53, except that input buffer 63 and output buffer 64 have been resized to have m' rows and m' columns, respectively. These buffers are then used to generate temporary file $f_N$. This last temporary file is shown in FIG. 5E and is denoted by reference numeral 66. Shown in temporary file $f_N$ is the last portion 67 of arrow 51.

It should be noted that if temporary files $f_1$ to $f_N$ were simply arranged left to right in order of file number, the resulting image would not be a rotated version of input image 50. Rather, arrow 51 would be distorted into a zigzag series of portions whose ends do not align. However, if input file 50 were rotated counter-clockwise, then arranging temporary files $f_1$ through $f_N$ from left to right in order of ascending file number would result in a rotated version of input image 50.

Figure 5F:
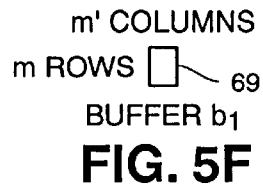
Figure 5G:
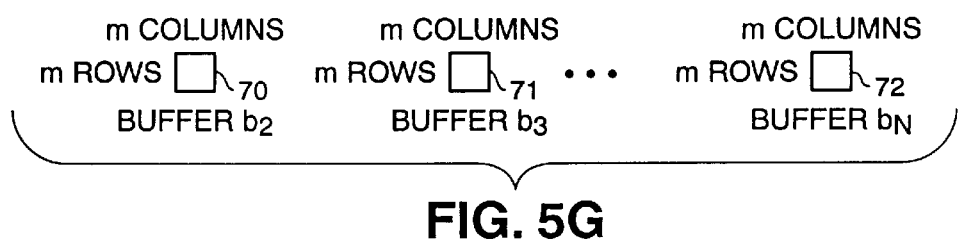

FIG. 5F shows input buffer $b_1$ to be used in reassembling the temporary files into the rotated destination file. Buffer $b_1$, denoted by reference numeral 69, has m' columns and m rows. FIG. 5G shows input buffers $b_2$ through $b_N$, also to be used in reassembling the temporary files. Each of the buffers, denoted by reference numerals 70 through 72, has m columns and m rows. As mentioned above, in the preferred embodiment, the number of rows m of input buffers 69 through 71 is the same as the number of rows m of input buffer 52. However, in an alternative embodiment, the number of rows of input buffers 69 through 71 can be different from the number of rows of input buffer 52.

It should also be noted that, in the case that input image 50 is to be rotated counter-clockwise, input buffer $b_1$ measures m columns by m rows, and input buffer $b_N$ measures m' columns by m rows.

Figure 5H:
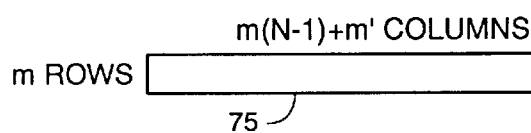

Shown in FIG. 5H is output buffer 75 measuring m rows by m(N−1)+M' columns. As mentioned above, this number of columns is equal to the number of rows in input image 50.

As described above with respect to FIG. 4B, each of the temporary files is read into the corresponding one of the input buffers, and the input buffers are then copied to the output buffer. Because input image 50 is being rotated clockwise in this example, temporary file $f_N$ is read into input buffer $b_1$, temporary file $f_{N-1}$ is read into input buffer $b_2$, etc. The input buffers are then copied to output buffer 75, which is written to the destination image.

Figure 5I:
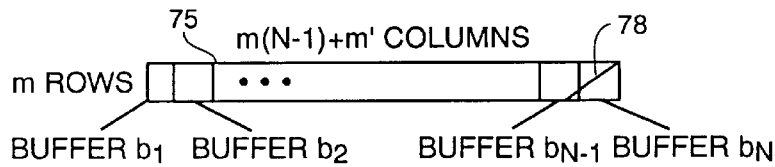

FIG. 5I shows the output buffer after m rows of temporary files $f_N$ to $f_1$ have been read into input buffers $b_1$ through $b_N$, respectively, and the input buffers have been copied to output buffer 75. Thus, after this operation, output buffer 75 contains portion 78 of arrow 51. This portion of arrow 51 includes all of portion 56 and part of portion 59 of arrow 51 shown in FIG. 5C.

Figure 5J:
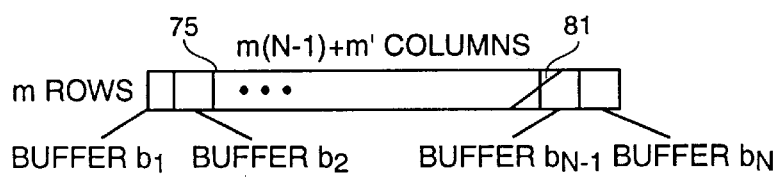

FIG. 5J shows output buffer 75 after the next set of m rows of the temporary files have been read into the input buffer, and the input buffers have been copied to output buffer 75. Thus, after this operation, output buffer 75 contains portion 81 of arrow 51.

Figure 5K:
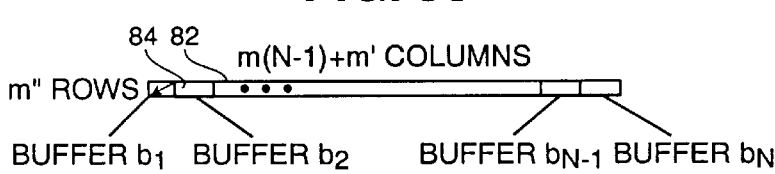

FIG. 5K shows output buffer 82, which is the same as output buffer 75 except that output buffer 82 has been resized to accommodate m" rows. Output buffer 82 is used after the temporary files have been read into the input buffers, copied to output buffer 75, and written to the destination file M times. Thus, output buffer 82 is used to accommodate the last m" rows of the image. Accordingly, as shown in FIG. 5K, output buffer 82 includes the last portion 84 of arrow 51.

Figure 5L:
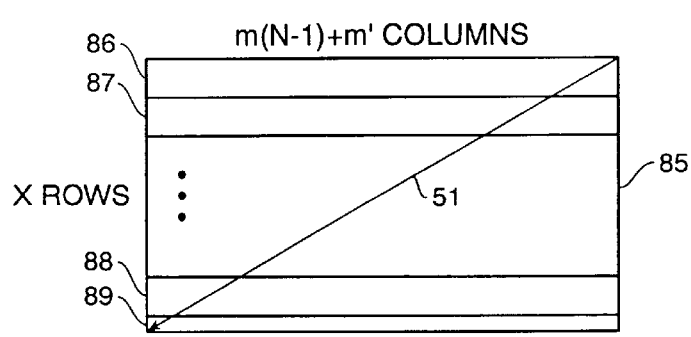

Shown in FIG. 5L is rotated destination image 85, including arrow 51 which has been rotated 90° clockwise. Denoted by reference numerals 86 through 89 are slices of output buffer 85 corresponding to individual times that the output buffers were written to the destination file.

The invention has been described with respect to particular illustrative embodiments. It is to be understood that the invention is not limited to the above described embodiments and that various changes and modifications may be made by those of ordinary skill in the art without departing from the spirit and scope of the invention.

What is claimed is:

1. A method for rotating an image using a volatile memory and temporary files, the method comprising the steps of:

inputting an image;

dividing the input image into portions;

loading a divided portion of the input image into the volatile memory;

rotating the loaded divided portion of the input image;

outputting the rotated divided portion of the input image into a corresponding temporary file, wherein said temporary file is located on a memory storage other than the volatile memory;

repeating the loading, rotating and outputting steps performed on the divided portions of the input image until all divided portions of the input image have been processed;

dividing the temporary files into portions;

loading one divided portion from each temporary file into the volatile memory;

assembling the loaded divided portions of the temporary files;

outputting the assembled divided portions of the temporary files to a destination image; and repeating the loading, assembling and outputting steps performed on the divided portions of the temporary files until all divided portions of the temporary files have been processed.

2. A method according to claim 1, wherein the input image is a color image.

3. A method according to claim 1, wherein the destination image is output to a file.

4. A method according to claim 1, wherein the destination image is output to a printer.

5. A method according to claim 1, wherein the destination image is output to a network interface.

6. A method according to claim 1, wherein the steps of dividing the input image into portions and repeatedly loading a divided portion of the input image into a volatile memory occur coextensively.

7. A method according to claim 1, wherein the steps of dividing the temporary files into portions and repeatedly loading one divided portion from each temporary file into the volatile memory occur coextensively.

8. A method for rotating an image, the method comprising the steps of:

inputting an image;

allocating an image input buffer;

determining a number of times that the image input buffer needs to be refilled in order to load the entire input image;

dividing the input image into portions based on the determination made in the determining step;

specifying a number of temporary files to be used for storing the divided portions of the input image;

reading a divided portion of the input image into the image input buffer;

rotating the read divided portion of the input image;

writing the rotated divided portion of the input image to a corresponding temporary file;

repeating the reading, rotating and writing steps performed on the input image until all portions of the input image have been written into the temporary files;

allocating a number of temporary file input buffers, each temporary file input buffer corresponding to one of the temporary files;

allocating an output buffer whose size is the sum of sizes of all temporary file input buffers;

reading a portion of each temporary file into the corresponding temporary file input buffer;

copying each temporary file input buffer to a corresponding place in the output buffer;

outputting the output buffer to a destination image file; and repeating the reading, copying and outputting steps until the destination image has been formed.

9. A method according to claim 8, wherein the steps of dividing the input image into portions and repeatedly reading a divided portion of the input image occur coextensively.

10. A method for rotating an image, the method comprising the steps of:

allocating an image input buffer;

determining a number of times that the image input buffer needs to be refilled in order to load the entire image;

specifying a number of temporary files to be used for storing the image;

reading a portion of the input image into the image input buffer;

rotating the read portion of the input image;

writing the rotated portion of the input image to a corresponding temporary file;

repeating the reading, rotating and writing steps performed on the input image until all portions of the input image have been written into the temporary files;

allocating a number of temporary file input buffers, each temporary file input buffer corresponding to one of the temporary;

reading a portion of each temporary file into the corresponding temporary file input buffer;

outputting each temporary file input buffer to a corresponding place in the destination image; and repeating the reading and outputting steps until the destination image has been formed.

11. An apparatus for rotating an image, comprising:

a memory including a volatile memory and temporary files, the memory also including a region for storing executable process steps; and a processor for executing the executable process steps;

wherein the processor executes the stored executable process steps in order to perform the steps of: (a) inputting an image, (b) dividing the input image into portions, (c) loading a divided portion of the input image into a volatile memory, (d) rotating the loaded divided portion of the input image, (e) outputting the rotated divided portion of the input image into a corresponding temporary file, wherein said temporary file is located on a storage medium other than the volatile memory, (f) repeating the loading, rotating and outputting steps performed on the divided portions of the input image until all divided portions of the input image have been processed, (g) dividing the temporary files into portions, (h) loading one divided portion from each temporary file into the volatile memory, (i) assembling the loaded divided portions of the temporary files, (j) outputting the assembled divided portions of the temporary files to a destination image, and (k) repeating the loading, assembling and outputting steps performed on the divided portions of the temporary files until all divided portions of the temporary files have been processed.

12. An apparatus according to claim 11, wherein the input image is a color image.

13. An apparatus according to claim 11, wherein the destination image is output to a file.

14. An apparatus according to claim 11, wherein the destination image is output to a printer.

15. An apparatus according to claim 11, wherein the destination image is output to a network interface.

16. An apparatus according to claim 11, wherein the steps of dividing the input image into portions and repeatedly loading a divided portion of the input image into a volatile memory occur coextensively.

17. An apparatus according to claim 11, wherein the steps of dividing the temporary files into portions and repeatedly loading one divided portion from each temporary file into the volatile memory occur coextensively.

18. An apparatus for rotating an image, comprising:

a memory including a volatile memory and temporary files, the memory also including a region for storing executable process steps; and a processor for executing the executable process steps;

wherein the processor executes the stored executable process steps in order to perform the steps of: (a) inputting an image, (b) allocating an image input buffer, (c) determining a number of times that the image input buffer needs to be refilled in order to load the entire input image, (d) dividing the input image into portions based on the determination made in the determining step, (e) specifying a number of temporary files to be used for storing the divided portions of the input image, (f) reading a divided portion of the input image into the image input buffer, (g) rotating the read divided portion of the input image, (h) writing the rotated divided portion of the input image to a corresponding temporary file, (i) repeating the reading, rotating and writing steps performed on the input image until all portions of the input image have been written into the temporary files, (j) allocating a number of temporary file input buffers, each temporary file input buffer corresponding to one of the temporary files, (k) allocating an output buffer whose size is the sum of sizes of all temporary file input buffers, (l) reading a portion of each temporary file into the corresponding temporary file input buffer, (m) copying each temporary file input buffer to a corresponding place in the output buffer, (n) outputting the output buffer to a destination image file, and (o) repeating the reading, copying and outputting steps until the destination image has been formed.

19. An apparatus according to claim 18, wherein the steps of dividing the image into portions and repeatedly reading a divided portion of the input image occur coextensively.

20. An apparatus for rotating an image, comprising:

a memory including a volatile memory and temporary files, the memory also including a region for storing executable process steps; and a processor for executing the executable process steps;

wherein the processor executes the stored executable process steps in order to perform the steps of: (a) allocating an image input buffer, (b) determining a number of times that the image input buffer needs to be refilled in order to load the entire image, (c) specifying a number of temporary files to be used for storing the image, (d) reading a portion of the input image into the image input buffer, (e) rotating the read portion of the input image, (f) writing the rotated portion of the input image to a corresponding temporary file, (g) repeating the reading, rotating and writing steps performed on the input image until all portions of the input image have been written into the temporary files, (h) allocating a number of temporary file input buffers, each temporary file input buffer corresponding to one of the temporary files, (i) reading a portion of each temporary file into the corresponding temporary file input buffer, (j) outputting each temporary file input buffer to a corresponding place in the destination image, and (k) repeating the reading and outputting steps until the destination image has been formed.

21. Computer-executable process steps stored on a computer-readable medium, the computer-executable process steps to rotate an image, the computer-executable process steps comprising:

code to input an image;

code to divide the input image into portions;

code to load a divided portion of the input image into the volatile memory;

code to rotate the loaded divided portion of the input image;

code to output the rotated divided portion of the input image into a corresponding temporary file, wherein said temporary file is located on a storage medium other than the volatile memory;

code to repeat execution of the codes to load, rotate and output that process the portions of the input image until all portions of the input image have been processed;

code to divide the temporary files into portions;

code to load one divided portion from each temporary file into the volatile memory;

code to assemble the loaded divided portions of the temporary files;

code to output the assembled divided portions of the temporary files to a destination image; and code to repeat execution of the codes to load, assemble and output that process the portions of the temporary files until all portions of the temporary files have been processed.

22. Computer-executable process steps according to claim 21, wherein the input image is a color image.

23. Computer-executable process steps according to claim 21, wherein the destination image is output to a file.

24. Computer-executable process steps according to claim 21, wherein the destination image is output to a printer.

25. Computer-executable process steps according to claim 21, wherein the destination image is output to a network interface.

26. Computer-executable process steps according to claim 21, wherein the steps of dividing the input image into portions and repeatedly loading a divided portion of the input image into a volatile memory occur coextensively.

27. Computer-executable process steps according to claim 21, wherein the steps of dividing the temporary files into portions and repeatedly loading one divided portion from each temporary file into the volatile memory occur coextensively.

28. Computer-executable process steps stored on a computer-readable medium, the computer-executable process steps to rotate an image, the computer-executable process steps comprising:

code to input an image;

code to allocate an image input buffer;

code to determine a number of times that the image input buffer needs to be refilled in order to load the entire input image;

code to divide the input image into portions based on the determination made in the determining step;

code to specify a number of temporary files to be used for storing the divided portions of the input image;

code to read a divided portion of the input image into the image input buffer;

code to rotate the read divided portion of the input image;

code to write the rotated divided portion of the input image to a corresponding temporary file;

code to repeat execution of the code to read, rotate and write that process the portions of the input image until all portions of the input image have been written into the temporary files;

code to allocate a number of temporary file input buffers, each temporary file input buffer corresponding to one of the temporary files;

code to allocate an output buffer whose size is the sum of sizes of all temporary file input buffers;

code to read a portion of each temporary file into the corresponding temporary file input buffer;

code to copy each temporary file input buffer to a corresponding place in the output buffer;

code to output the output buffer to a destination image file; and code to repeat execution of the code to read, copy and output that process the temporary files until the destination image has been formed.

29. Computer-executable process steps according to claim 28, wherein the steps of dividing the input image into portions and repeatedly reading a divided portion of the input image occur coextensively.

30. Computer-executable process steps stored on a computer-readable medium, the computer-executable process steps to rotate an image, the computer-executable process steps comprising:

code to allocate an image input buffer;

code to determine a number of times that the image input buffer needs to be refilled in order to load the entire image;

code to specify a number of temporary files to be used for storing the image;

code to read a portion of the input image into the image input buffer;

code to rotate the read portion of the input image;

code to write the rotated portion of the input image to a corresponding temporary file;

code to repeat execution of the code to read, rotate and write that process the portions of the input image until all portions of the input image have been written into the temporary files;

code to allocate a number of temporary file input buffers, each temporary file input buffer corresponding to one of the temporary files;

code to read a portion of each temporary file into the corresponding temporary file input buffer;

code to output each temporary file input buffer to a corresponding place in the destination image; and code to repeat execution of the code to read and output that process the temporary files until the destination image has been formed.

* * * * *

UNITED STATES PATENT AND TRADEMARK OFFICE
CERTIFICATE OF CORRECTION

PATENT NO. : 6,271,929 B1
DATED : August 7, 2001
INVENTOR(S) : Jun Zhao

Page 1 of 1

It is certified that error appears in the above-identified patent and that said Letters Patent is hereby corrected as shown below:

Column 9,
Line 6, "above described" should read -- above-described --.

Column 10,
Line 43, "temporary;" should read -- temporary files; --.

Signed and Sealed this

Twelfth Day of March, 2002

Attest:

JAMES E. ROGAN
Attesting Officer
Director of the United States Patent and Trademark Office